United States Patent [19]

Kim et al.

[11] Patent Number: 5,506,733
[45] Date of Patent: Apr. 9, 1996

[54] APPARATUS FOR RECORDING AND REPRODUCING DIGITAL AND ANALOG VIDEO SIGNALS USING TWO ANALOG RECORD/REPRODUCE HEADS AND TWO DIGITAL RECORD/REPRODUCE HEADS, RESPECTIVELY

[75] Inventors: Soo K. Kim; Mun C. Joung, both of Seoul; Yong H. Shin, Kyungki-Do; Man C. Choi, Seoul; Yoon S. Seoh, Seoul; Soon K. Lim, Seoul; Joong K. Joh, Seoul, all of Rep. of Korea

[73] Assignee: Goldstar Co., Ltd., Rep. of Korea

[21] Appl. No.: 177,169

[22] Filed: Jan. 4, 1994

[30] Foreign Application Priority Data

| Jan. 5, 1993 | [KR] | Rep. of Korea | 37/1993 |
| Feb. 5, 1993 | [KR] | Rep. of Korea | 1576/1993 |
| Mar. 15, 1993 | [KR] | Rep. of Korea | 3775/1993 |
| Apr. 19, 1993 | [KR] | Rep. of Korea | 6583/1993 |

[51] Int. Cl.$^6$ .................................................. G11B 5/02
[52] U.S. Cl. .................... 360/27; 360/64; 360/65; 360/73.08; 358/335
[58] Field of Search .................... 360/27, 32, 46, 360/61, 73.08, 33.1, 62, 64, 65; 358/335

[56] References Cited

U.S. PATENT DOCUMENTS

| 4,536,806 | 8/1985 | Louth | 360/73.08 X |
| 5,130,864 | 7/1992 | Shimada | 360/32 |
| 5,172,280 | 12/1992 | Quintus et al. | 360/46 |
| 5,175,630 | 12/1992 | Tabuchi et al. | 358/330 |
| 5,295,023 | 3/1994 | Sekii | 360/61 X |
| 5,303,094 | 4/1994 | Kato et al. | 360/32 |

FOREIGN PATENT DOCUMENTS

| 0310373 | 9/1988 | European Pat. Off. .. |
| 0488337 | 11/1991 | European Pat. Off. .. |
| 60-85470 | 5/1985 | Japan . |
| 60-209969 | 10/1985 | Japan . |
| 63-298865 | 12/1988 | Japan . |

OTHER PUBLICATIONS

Patent Abstract of Japan vol. 15 No. 326 JP-3121685, Atsushi, May 23, 1991 Signal Discrimination Circuit.
Patent Abstract of Japan, vol. 13 No. 129 (JP63298863) Yoshitake et al., Picture Reproducing Device, Dec. 6, 1988.
Patent Abstract of Japan vol. 13, 129 (JP63298865), Yoshitake et al. Image Recorder, Dec. 6, 1988.

*Primary Examiner*—Andrew L. Sniezek
*Attorney, Agent, or Firm*—Ostrolenk, Faber, Gerb & Soffen

[57] ABSTRACT

An apparatus for recording and reproducing digital/analog video signals including a single head drum attached with heads for processing analog video signals and heads for processing digital video signals, and switches performing switching operations on the basis of the kind of input video signals. The head drum is variable in speed, depending on the kind of input video signals. In accordance with the apparatus, both analog and digital signals can be recorded and reproduced by a single recording unit and a single reproducing unit both capable of varying in characteristic, based on a video signal received thereto. This provides a reduction in manufacture cost and a light, thin, simple and compact construction of the existing VCRs.

10 Claims, 5 Drawing Sheets

TP' = 2TP

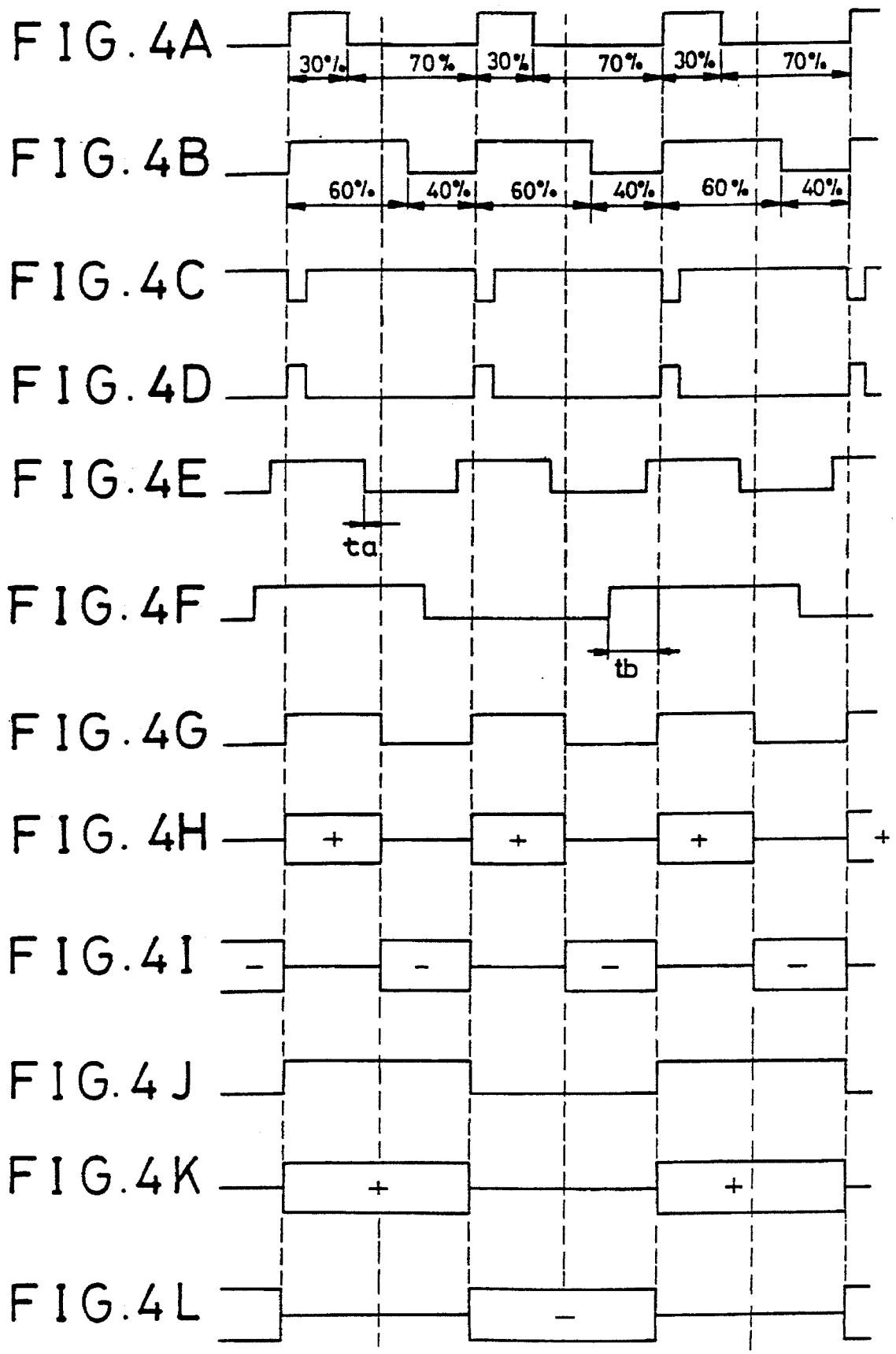

APPARATUS FOR RECORDING AND REPRODUCING DIGITAL AND ANALOG VIDEO SIGNALS USING TWO ANALOG RECORD/REPRODUCE HEADS AND TWO DIGITAL RECORD/REPRODUCE HEADS, RESPECTIVELY

BACKGROUND OF THE INVENTION

1. Field of the Invention

The present invention relates to an apparatus for recording and reproducing digital/analog video signals, and more particularly to an apparatus for recording and reproducing digital/analog video signals, capable of achieving recording and reproduction of both a digital video signal and an analog video signal, thereby exhibiting compatibility with the existing VHS system.

2. Description of the Prior Art

On tapes for VCRs of the VHS system capable of recording NTSC broadcast signals and PAL broadcast signals, analog video signals are recorded. These video signals are recorded with a bandwidth of 5 MHz in case of VHF format and with a bandwidth of 7 MHz in case of SVHS.

For recording analog video signals with a band width of 5 to 7 MHz, conventional VCRs include a pair of video heads, an amplifier for record and reproduction of analog video signals, and a signal processing circuit. A relative head drum speed corresponding to a recording wavelength of the video signals is 5.8 m/s (1,800 rpm in a case of a head drum having a diameter of 62 mm).

Where digital video signals are used as receivable signals of high definition televisions (HDTVs), they should be recorded at a higher density than that of analog video signals because of their large data amount (at least 5 times that of analog video signals).

For recording digital video signals with a bandwidth of about 15 MHz, digital video signal-recordable VCRs include at least one pair of video heads, an amplifier for record and reproduction of digital video signals, and a signal processing circuit. A relative head drum speed corresponding to a recording wavelength of the video signals is 11.6 m/s (3,600 rpm in case of a head drum having a diameter of 62 mm).

However, conventional VCRs capable of recording analog video signals can not reproduce tapes on which digital video signals are recorded. On the other hand, existing digital VCRs capable of recording digital video signals can not reproduce tapes on which analog video signals are recorded. In other words, conventional VCRs have no compatibility digital and analog signals. As a result, there has been a problem that separate VCRs should be provided for record/reproduction of an analog video signal and a digital video signal, respectively.

SUMMARY OF THE INVENTION

Therefore, an object of the invention is to provide an apparatus for recording and reproducing digital/analog video signals, having compatibility capable of achieving record and reproduction of both a digital video signal and an analog video signal.

Another object of the invention is to provide an apparatus for recording and reproducing digital/analog video signals, capable of recording digital video signals on a tape for record and reproduction of analog video signals, thereby enabling the use of a tape of the existing VHS type or SVHS type as it is.

In accordance with the present invention, this object can be accomplished by providing an apparatus for recording and reproducing digital/analog video signals, comprising: and input switch for selecting one of an analog video signal and a digital video signal inputted in a record mode; a recording unit for processing said video signal selected by a switching operation of said input switch to record the video signal on a tape; head means for recording a video signal on said tape and reproducing said video signal recorded on the tape, said head means having an analog video signal-processing head portion and a digital video signal-processing head portion; switching means for selecting one of said head portions to record the video signal outputted from said recording unit on the tape and reproduce said video signal outputted from the head means; a capstan for rotating a capstan motor in accordance with a mode selected by a user and feeding the tape by the rotation of said capstan motor; an audio/control head for generating a control signal on the basis of said video signal recorded on the tape being fed and performing a record mode or a play mode; a head drum rotating by a drum motor to record or reproduce an analog video signal and a digital video signal through said head means during its rotation; a reproducing unit for receiving said video signal from the head means through said switching means and reproducing the received video signal; a comparing unit for comparing an output signal of said reproducing unit with said control signal of said audio/control head to check whether said output signal of the reproducing unit is an analog video signal or a digital video signal; an output switch for selectively outputting the output signal of the reproducing unit in accordance with a control signal outputted from said comparing unit; and a control unit for outputting control signals for said units of the apparatus in accordance with a selected operation mode.

BRIEF DESCRIPTION OF THE DRAWINGS

Other objects and aspects of the invention will become apparent from the following description of embodiments with reference to the accompanying drawings in which:

FIGS. 3A and 3B are schematic views respectively illustrating patterns of video signals recorded on tapes, in which FIG. 3A is for analog video signals while FIG. 3B is for digital video signals;

FIGS. 4A to 4L are waveform diagrams of various signals outputted from various units of FIG. 2 in a play mode.

DETAILED DESCRIPTION OF THE PREFERRED EMBODIMENTS

Figure 2:
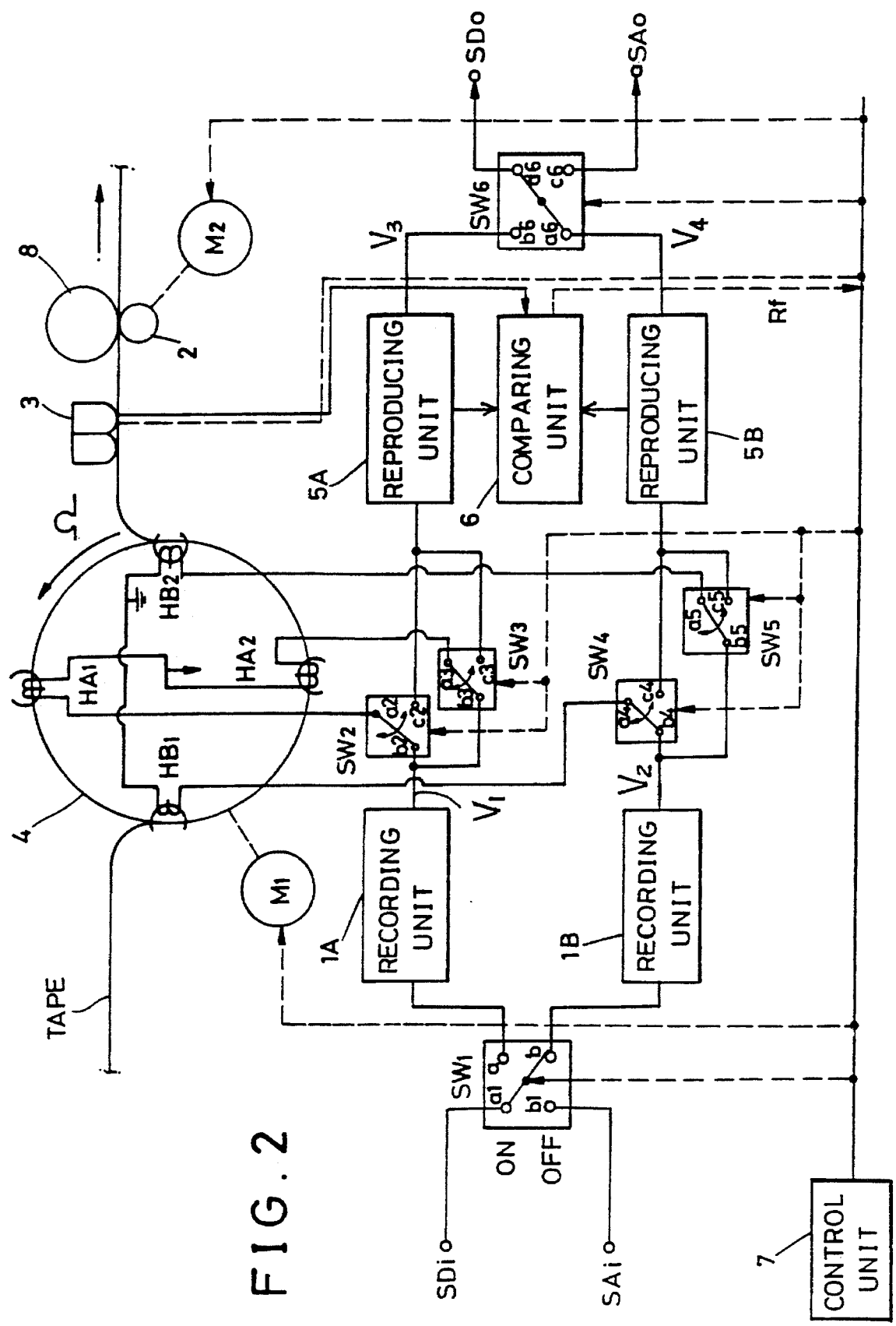
FIG. 2 is a block diagram of an apparatus for recording and reproducing digital/analog video signals in accordance with a first embodiment of the present invention.

FIG. 2 is a block diagram of an apparatus for recording and reproducing digital/analog video signals in accordance with a first embodiment of the present invention.

As shown in FIG. 2, the apparatus comprises a switch $SW_i$ for selecting one of an analog video signal $SA_i$ and a digital video signal $SD_i$ inputted in a record mode, a pair of recording units 1A and 1B for processing the analog video signal $SA_i$ and the digital video signal $SD_1$ selected by the switching operation of the switch $SW_1$, respectively, two pairs of switches, one pair including two switches $SW_2$ and $SW_3$ each adapted to select a corresponding head for recording the analog video signal $SA_1$ on a tape and the other pair including two switches $SW_4$ and $SW_5$ each adapted to select a corresponding head for recording the digital video signal $SD_1$, and two pairs of heads, one pair including two heads $HA_1$ and $HA_2$ respectively adapted to record the analog video signal $SA_i$ passing through the switches $SW_2$ and $SW_3$ and the other pair including two heads $HB_1$ and $HB_2$ respectively adapted to record the digital video signal $DA_i$ passing through the switches $SW_4$ and $SW_5$. The apparatus further comprises a capstan 2 for being rotated by a capstan motor $M_2$ in accordance with a mode selected by the user and feeding the tape by the rotation of the capstan, an audio/control head 3 for outputting a control signal Ctl on the basis of video signals recorded on the tape being fed and performing a record mode or a play mode, a head drum 4 adapted to be rotated by a drum motor $M_1$ and record or reproduce the analog video signal $SA_i$ and the digital video signal $SD_i$ through the heads $HA_1$, $HA_2$, $HB_1$ and $HB_2$ during its rotation, a pair of reproducing units 5A and 5B, one adapted to reproduce and process video signals respectively received from the heads $HA_1$ and $HA_2$ via the switches $SW_2$ and $SW_3$ switched on in the play mode and the other adapted to reproduce and process video signals respectively received from the heads $HB_1$ and $HB_2$ via the switches $SW_4$ and $SW_5$ switched on in the play mode, a comparing unit for comparing each of the output signals from the reproducing units 5A and 5B with the control signal Ctl from the audio/control head 3 and checking whether the compared output signal is an analog video signal or a digital video signal, on the basis of the comparison, a switch $SW_6$ for selecting one of outputs $SA_0$ and $SD_0$ of the reproducing units 5A and 5B in accordance with a control signal from the comparing unit 6, and a control unit 7 for outputting control signals for various units of the apparatus.

In FIG. 2, the reference numeral 8 denotes a pinch roller for feeding the tape.

Figure 1:
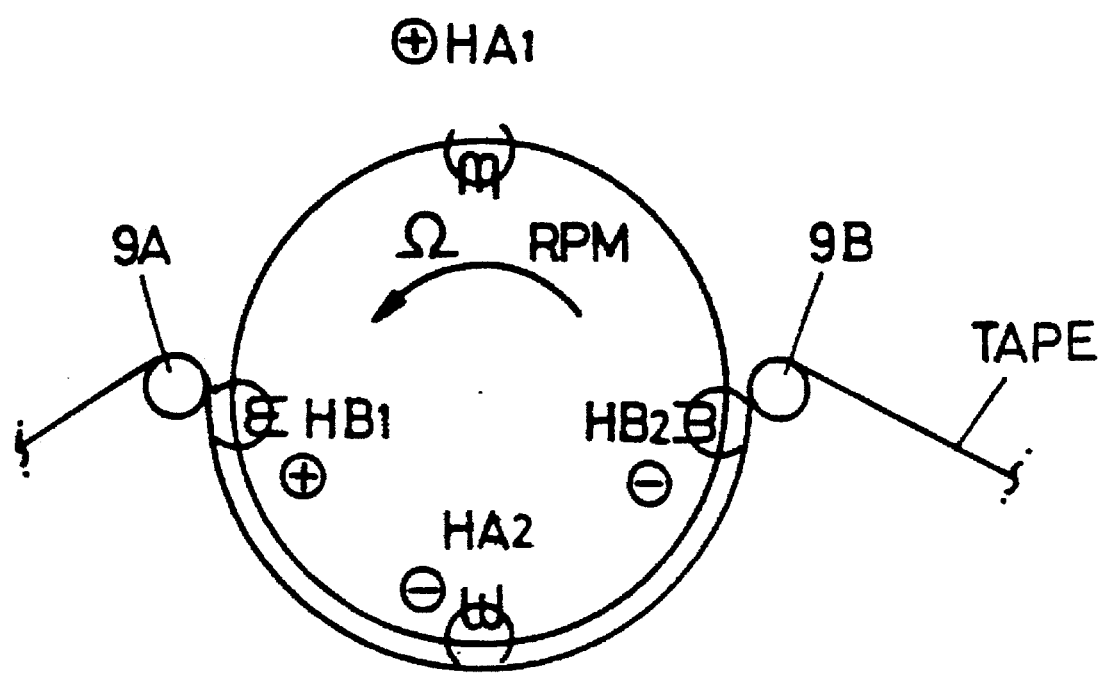
FIG. 1 is a schematic view of a head drum employed in accordance with the present invention.

Each of the recording units 1A and 1B comprises a pre-amplifier, a modulator and an equalizer. As shown in FIG. 1, the head drum 3 is mounted with the heads $HA_1$, $HB_1$, $HA_2$ and $HB_2$ spaced from one another at an angle of 90°. Together with two guide posts 9A and 9B, the head drum 3 serves to maintain the tape at an azimuth angle of at least 180°. To the head drum 3, a phase generator is also attached. Based on a detect signal from the phase generator, switching operations of the switches $SW_2$ to $SW_6$ are achieved. The detect signal of the phase generator is also used for the selection of the heads $HA_1$, $HA_2$, $HB_1$ and $HB_2$.

The heads $HA_1$ and $HA_2$ are heads arranged at an angle of 180° with respect to each other and adapted to record and reproduce analog signals. Each of heads $HA_1$ and $HA_2$ has an azimuth angle of ±6°. On the other hand, the heads $HB_1$ and $HB_2$ are heads arranged at an angle of 180° with respect to each other and adapted to record and reproduce digital signals. Each of heads $HB_1$ and $HB_2$ has an azimuth angle of ±15° and a phase angle of 90° with respect to the heads $HA_1$ and $HA_2$.

For recording video signals in the recording/reproducing apparatus having the above-mentioned arrangement, the switch $SW_1$ is switched in accordance with a control signal from the control unit 7 to select one of an analog video signal $SA_1$ and a digital video signal $SD_1$. The selected video signal is then applied to a corresponding one of the recording units 1A and 1B. At this time, the switches $SW_2$, $SW_3$, $SW_4$ and $SW_5$ are switched so that their fixed contacts $a_2$, $a_3$, $a_4$ and $a_5$ can be connected with their movable contacts $b_2$, $b_3$, $b_4$ and $b_5$, respectively.

When the digital video signal $SD_1$ is recorded, the switch $SW_1$ is switched to obtain a connection between its contacts $a_1$ and $b_1$. As a result, the digital video signal $SD_i$ is fed to the recording unit 1B and then modulated after being amplified to a predetermined level. The modulated video signal denoted by the reference character $V_2$ is applied from the recording unit 1B to the heads $HB_1$ and $HB_2$ for digital signals via the switches $SW_4$ and $SW_5$ switched on under a control of the control unit 7.

Figure 3A:
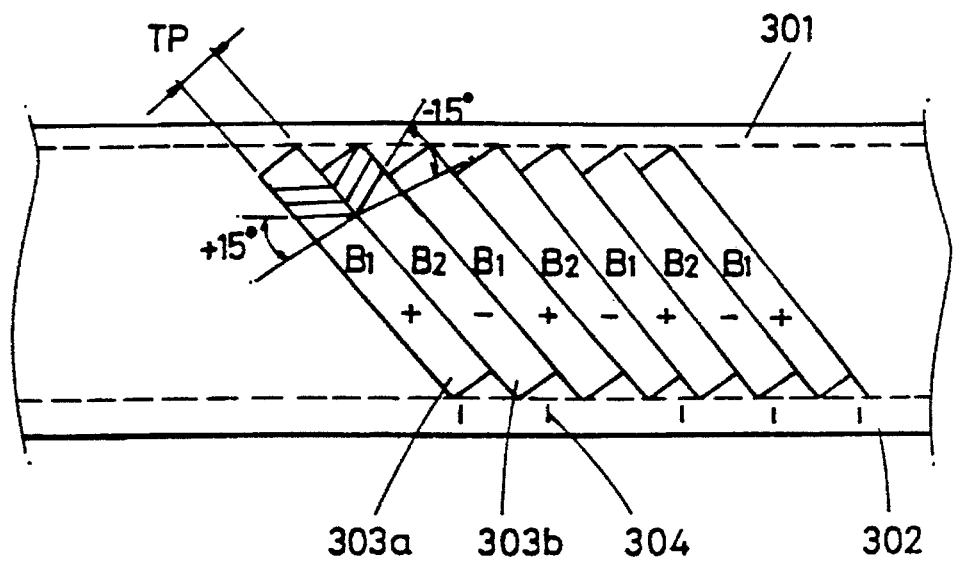

As the capstan 2 rotates by the capstan motor $M_2$, a tape is fed at a speed corresponding to a half of a recording speed Vt for analog video signals. During the travel of the tape, the modulated video signal $V_2$ is recorded on the tape, as shown in FIG. 3A. Also, a control signal Ctl B shown in FIG. 4A is recorded on the lower track end 302 of the tape by the audio/control head 3.

As mentioned above, the input digital video signals $SD_1$ are recorded on inclined tracks 303a and 303b having a constant track pitch $T_p$ and an azimuth angle of ±15°, as shown in FIG. 3A. Control signals Ctl B designated at 304 are recorded on the lower track end 302 of the tape. On the other hand, audio signals are recorded on the upper track end 301 of the tape.

Figure 3B:
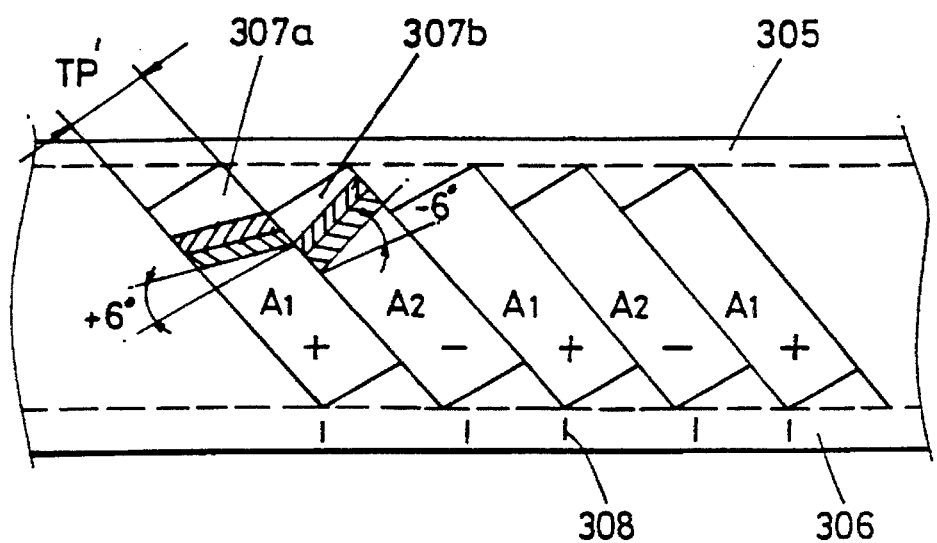

When the analog video signal $SA_1$ is recorded, the switch $SW_1$ is switched to obtain a connection between its contacts $b_1$ and $a_1$. As a result, the analog video signal $SA_i$ is fed to the recording unit 1A which, in turn, modulates the analog video signal $SA_1$. The modulated video signal denoted by the reference character $V_1$ is applied from the recording unit 1A to the heads $HA_1$ and $HA_2$ for analog signals via the switches $SW_2$ and $SW_3$ switched on under a control of the control unit 7. The modulated video signal $V_1$ is then recorded on a tape being fed at a normal speed $V_t$, as shown in FIG. 3B. Also, a control signal Ctl A shown in FIG. 4B is recorded at 308 on the lower track end 306 of the tape.

Input analog video signals $SA_1$ are recorded on inclined tracks 307a and 307b having a track pitch corresponding to twice the track pitch $T_p$ of the tracks 303a and 303b and an azimuth angle of ±6°, as shown in FIG. 3B. Control signals Ctl A are recorded on the lower track end 306 of the tape. The recording of control signals Ctl A is accomplished in a manner that the recorded signals can be compatible with the tape patterns of the existing VHS standard.

By the drum driving motor $M_1$ driven in accordance with the control signal from the control unit 7, the head drum 4 rotates at a rate of 3,600 rpm in the case of digital video signals and at a rate of 1,800 rpm in the case of analog video signals.

For reproducing video signals recorded in the above-mentioned manner, the switches $SW_2$, $SW_3$, $SW_4$ and $SW_5$ are switched so that their fixed contacts $a_2$, $a_3$, $a_4$ and $a_5$ can be connected with their movable contacts $c_2$, $c_3$, $c_4$ and $c_5$, respectively. By such switching operations of the switches $SW_2$, $SW_3$, $SW_4$ and $SW_5$, video signals reproduced by the heads $HA_1$, $HA_2$, $HB_1$ and $HB_2$ are applied to and processed by corresponding reproducing units 5A and 5B, respectively.

At the same time, the audio/control head 3 detects control signals Ctl from the tape being fed. Together with each reproduced video signal, each control signal Ctl is applied to the comparing unit 6. The comparing unit 6 compares the received signals with each other. When the reproduced video signal is a digital video signal, the comparing unit 6 outputs a reference signal Rf B as shown in FIG. 4C. When the reproduced video signal is an analog video signal, the comparing unit 6 outputs a reference signal Rf A as shown in FIG. 4D.

The control unit 7 receives the reference signal which is one of the signals Rf A and Rf B and discriminates whether the reproduced video signal is an analog video signal or a digital video signal. The control unit 7 outputs a control signal corresponding to the discrimination result. By the control signal from the control unit 7, the switch $SW_6$ is switched to select one of outputs $V_3$ and $V_4$ of the reproducing units 5A and 5B. The switches $SW_2$ to $SW_5$ are also appropriately switched by the control signal from the control unit 7. The drum motor $M_1$ and the capstan motor $M_2$ are controlled by the reference signal Rf A or Rf B of the comparing unit 5 to rotate at respective appropriate speeds corresponding to the recorded video signal.

By the control signal from the control unit 7, the phase generator equipped in the head drum 4 is driven to output a detect signal for switching the switches $SW_2$ to $SW_5$. Detect signals for a digital video signal and an analog video signal are shown in FIGS. 4E and 4F, respectively.

As shown in FIG. 4E, the detect signal takes precedence in phase by a predetermined time $t_a$, over a digital video signal outputted from the head $HB_1$ as shown in FIG. 4H. On the other hand, the detect signal shown in FIG. 4F takes precedence in phase by a predetermined time $t_b$, over an analog video signal outputted from the head $HA_1$ as shown in FIG. 4K.

As the phase generator outputs the detect signal shown in FIG. 4E, the control unit 7 generates a switching signal HSW as shown in FIG. 4G. By the switching signal HSW, the switches $SW_4$ and $SW_5$ are switched respectively to send the digital video signals reproduced in the heads $HB_1$ and $HB_2$, as shown in FIGS. 4H and 4I, to the reproducing unit 5B which, in turn, demodulates the digital video signals. The demodulated digital video signals are outputted from the reproducing unit 5B via the switch $SW_6$ in which its contacts $a_6$ and $d_6$ are connected to each other.

The reproduced digital video signals outputted from the reproducing unit 5B are displayed on a screen as HDTV image signals $SD_0$.

As the phase generator outputs the detect signal shown in FIG. 4F, the control unit 7 generates a switching signal ½HSW as shown in FIG. 4J. By the switching signal ½HSW, the switches $SW_2$ and $SW_3$ are switched respectively to send the analog video signals reproduced in the heads $HA_1$ and $HA_2$, as shown in FIGS. 4K and 4L, to the reproducing unit 5A which, in turn, demodulates the analog video signals. The demodulated analog video signals are outputted from the reproducing unit 5A via the switch $SW_6$ in which its contacts $b_6$ and $c_6$ are connected to each other.

The reproduced analog video signals outputted from the reproducing unit 5A are displayed on a screen as NTSC image signals $SA_0$.

Figure 5:
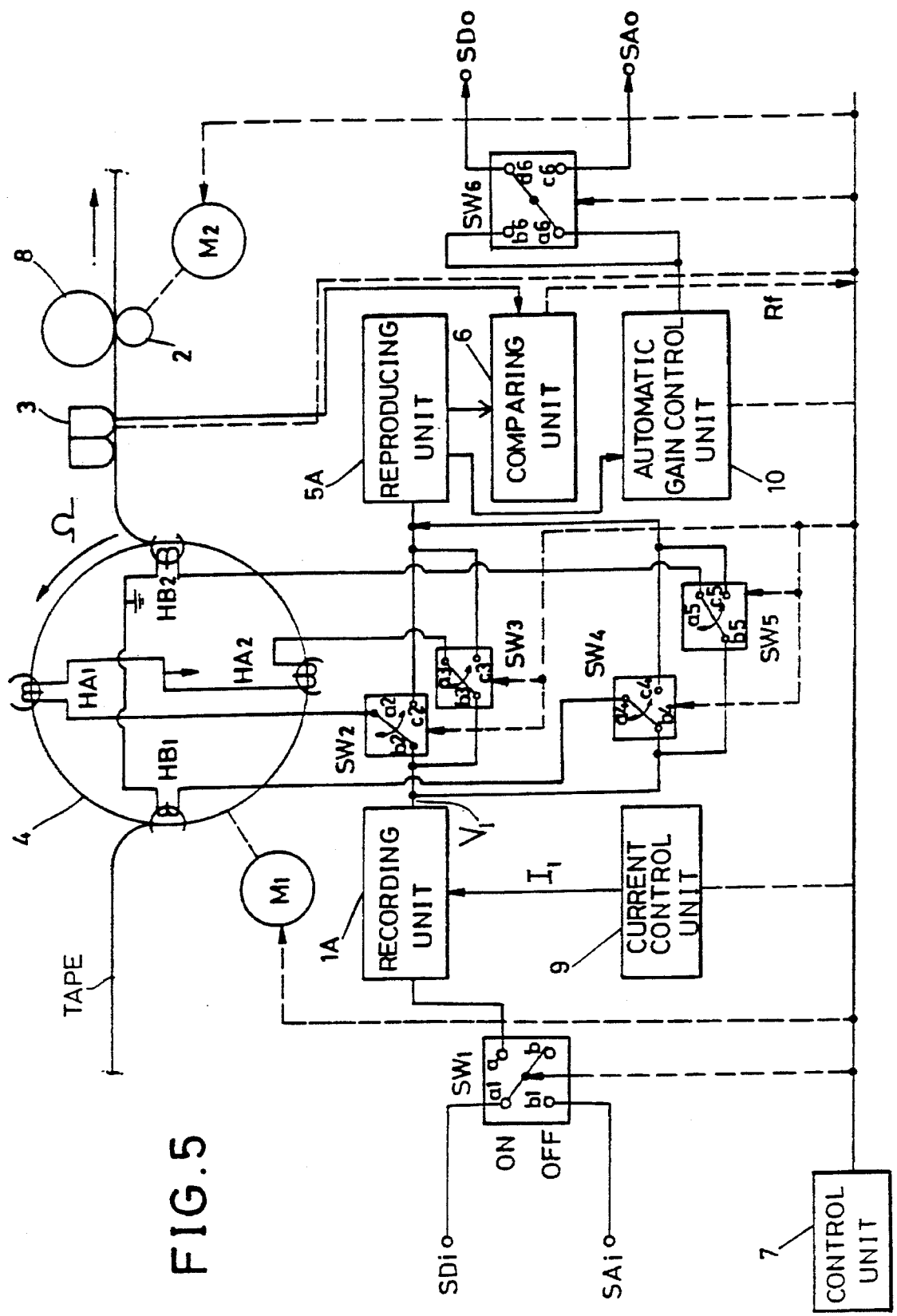
FIG. 5 is a block diagram of an apparatus for recording and reproducing digital/analog video signals in accordance with a second embodiment of the present invention.

FIG. 5 is a block diagram of an apparatus for recording and reproducing digital/analog video signals in accordance with a second embodiment of the present invention.

As shown in FIG. 5, the apparatus comprises a switch $SW_1$, two pairs of switches, one pair including two switches $SW_2$ and $SW_3$ and the other pair including two switches $SW_4$ and $SW_5$, two pairs of heads, one pair including two heads $HA_1$ and $HA_2$ and the other pair including two heads $HB_1$ and $HB_2$, a capstan motor $M_2$, a capstan 2, an audio/ control head 3, a head drum 4, a drum motor $M_1$, a recording unit 1A, a reproducing unit 5a, a comparing unit 6, a control unit 7, a current control unit 9 for varying the amount of current applied to the recording unit 1A under a control of the control unit 7, and an automatic gain control unit 10 for automatically controlling a gain of a video signal reproduced in the reproducing unit 5A in accordance with a control signal generated from the control unit 7. In accordance with this embodiment, the switch $SW_1$, the switches $SW_2$, $SW_3$, $SW_4$ and $SW_5$, the heads $HA_1$, $HA_2$, $HB_1$ and $HB_2$, the capstan motor $M_2$, the capstan 2, the audio/control head 3, the head drum 4, the drum motor $M_1$, the recording unit 1A, the reproducing unit 5A, the comparing unit 6 and control unit 7 have the same constructions as those in the first embodiment. In accordance with the second embodiment, the recording unit 1B and the reproducing unit 5B used in the apparatus of the first embodiment are omitted.

For recording video signals in the recording/reproducing apparatus having the above-mentioned arrangement, the switch $SW_1$ is switched in accordance with a control signal from the control unit 7 to select one of an analog video signal $SA_1$ and a digital video signal $SD_1$. The selected video signal is then applied to the recording unit 1A.

At this time, a control signal outputted from the control unit 7 and applied to the current control unit controls the varying of the amount of current $I_1$ outputted from the current control unit 9. The controlled current $I_1$ is then applied to the recording unit 1A to convert the band and characteristic of the video signal selected by switch $SW_1$ and received in the recording unit 1A.

In other words, the amount of the current $I_1$ is varied, depending on the kind of the selected video signal. As a result, the recording unit 1A has a bandwidth and a characteristic thereof both varied in accordance with the current $I_1$ varied in amount. Accordingly, the input video signal is modulated with the varied bandwidth and characteristic.

The modulated video signal $V_1$ is then applied to selected ones of the heads $HA_1$, $HA_2$, $HB_1$ and $HB_2$ via selected ones of the switches $SW_2$, $SW_3$, $SW_4$ and $SW_5$ to be recorded on a tape being fed. This procedure is the same as that of the first embodiment.

For reproducing video signals recorded in the above-mentioned manner, the switches $SW_2$, $SW_3$, $SW_4$ and $SW_5$ are switched so that their fixed contacts $a_2$, $a_3$, $a_4$ and $a_5$ can be connected with their movable contacts $c_2$, $c_3$, $c_4$ and $c_5$, respectively. By such switching operations of the switches $SW_2$, $SW_3$, and $SW_4$ and $SW_5$, video signals reproduced by the heads $HA_1$, $HA_2$, $HB_1$ and $HB_2$ are applied to and processed by the reproducing unit 5A.

At the same time, the audio/control head 3 detects control signals Ctl from the tape being fed. Together with each reproduced video signal, each control signal Ctl is applied to the comparing unit 6. The comparing unit 6 compares the received signals with each other. When the reproduced video signal is a digital video signal, the comparing unit 6 outputs a reference signal Rf B as shown in FIG. 4C. When the reproduced video signal is an analog video signal, the comparing unit 6 outputs a reference signal Rf A as shown in FIG. 4D.

The control unit 7 receives the reference signal which is one of the signals Rf A and Rf B and discriminates whether the reproduced video signal is an analog video signal or a digital video signal. The control unit 7 outputs a control signal corresponding to the discrimination result. By the control signal from the control unit 7, the video signal reproduced in the reproducing unit 5A is applied to the automatic gain control unit 10 which, in turn, controls the gain of the video signal. The gain of the video signal is varied, based on a corresponding one of a digital video signal bandwidth and an analog video signal bandwidth.

Thereafter, the video signal varied in gain is demodulated and then outputted. This procedure is the same as that of the first embodiment.

Although two pairs of heads are used for an analog video signal and a digital video signal, respectively, only one pair of heads, such as either of the pair of heads $HA_1$ and $HA_2$ or the pair of heads $HB_1$ and $HB_2$ shown in FIGS. 1, 2 and 5, may be used for both the analog video signal and the digital video signal by varying the amount of current applied to the heads such that the single pair of heads receive different amounts of current when processing an analog video signal and a digital video signal, that is, such that the single pair of heads receive different amounts of current when operating as an analog video signal-processing head portion adn a digital video signal-processing head portion.

As apparent from the above description, the present invention provides an apparatus for recording and reproducing digital/analog video signals, capable of achieving recording and reproduction of both a digital video signal and an analog video signal by use of one head drum. Accordingly, it is possible to reproduce tapes of the existing analog type and yet maintain the function of high definition digital VCRs.

In accordance with the present invention, both the analog signal and the digital signal can be recorded and reproduced by a single recording unit and a single reproducing unit both capable of varying in characteristic, based on a video signal received thereto. This provides a reduction in manufacture cost and a light, thin, simple and compact construction of the existing VCRs.

Although the preferred embodiments of the invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for recording and reproducing digital and analog video signals, the apparatus comprising:

input switch means for selecting one of an analog video signal and a digital video signal to be inputted in a record mode;

recording unit means for processing said video signal selected by said input switch means into a signal recordable on a video tape;

head means carried by a rotatable head drum means and maintained in relation with video tape over at least 180° of the rotation of said head drum means for recording, in accordance with the rotation of said head drum means relative said video tape, and in said record mode a video signal on said tape as inclined tracks thereon and for, in a reproducing mode, reproducing said video signal recorded on the tape, said head means having an analog video signal-processing head portion for recording and reproducing analog video signals on and from said video tape and a digital video signal-processing head portion for recording and reproducing digital video signals on and from said video tape, wherein said head means comprises four heads carried by said head drum and arranged spaced from one another at an angle of 90° to define a phase angle of 90° between adjacent ones of said heads, two 180°-opposing ones of said heads having about equal azimuth angles of opposite polarities constituting said analog video signal-processing head portion and the other two 180°-opposing ones of said heads having about equal azimuth angles of opposing polarities constituting said digital video signal-processing head portion;

switching means for selecting one of said analog video signal-processing head portion and said digital video signal-processing head portion of said head means to record the video signal processed by said recording unit on the video tape in the record mode and to output said video signal reproduced from the video tape by the head means in the reproducing mode;

reproducing unit means for receiving said reproduced video signal output from the head means through said switching means and processing the received video signal into a form suitable for being output; and output switch means for outputting the video signal processed by reproducing unit means.

2. An apparatus in accordance with claim 1, wherein each of said input switch means and said output switch means has two switching positions respectively corresponding to said analog video signal and said digital video signal.

3. An apparatus in accordance with claim 1, wherein said switch means has four switching positions respectively for connecting an output of said recording unit means to said digital signal-processing head portion of said head means in the record mode, for connecting said output of the recording unit means to said analog signal-processing head portion of the head means in the record mode, for connecting the digital signal-processing head portion of the head means to said reproducing unit means in the reproducing mode, and for connecting the analog signal-processing head portion of the head means to the reproducing unit means in the reproducing mode.

4. An apparatus in accordance with claim 1, wherein said head means comprises a single pair of heads for constituting both said analog video signal-processing head portion and said digital video signal-processing head portion, and wherein an amount of current to be applied to said head means is varied such that the analog video signal-processing head portion and the digital video signal-processing head portion receive different amounts of current.

5. The apparatus in accordance with claim 1, wherein the heads comprising said digital video signal-processing head portion each have an azimuth angle of about 15° and the heads comprising said analog video signal-processing head portion each have an azimuth angle of about 6°.

6. The apparatus in accordance with claim 1, further comprising:

capstan means rotatable by a capstan motor for transporting said video tape relative said head drum means;

audio/control head means for recording a control signal on said video tape in said record mode during recording said input video signal by said head means and for detecting said recorded control signal from said video tape during reproducing of said recorded video signal by said head means in said reproducing mode, said control signal being indicative of whether said recorded video signal is an analog video signal or a digital video signal; and comparing unit means for, in said reproducing mode, comparing said reproduced video signal being processed by said recording unit means with the control signal detected by said audio/control head means for checking whether said reproduced video signal is a digital video signal or an analog video signal and outputting a reference signal indicative of said comparison.

7. The apparatus according to claim 6, further comprising:

control unit means for receiving the reference signal from said comparison unit means and on the basis thereof discriminating whether the recorded video signal being reproduced by said head means is an analog video signal or a digital video signal and for controlling said head drum motor, said capstan motor, said switching means and said output switch means in accordance with said discrimination.

8. The apparatus according to claim 1, wherein said recording unit means comprises:

an analog video signal recording unit for processing the analog video signal selected by said input switch means into a form suitable for being recorded on the video tape by said analog video signal-processing head portion of said head means; and a digital video signal recording unit for processing the digital video signal selected by said input switch means into a form suitable for being recorded on the video tape by said digital video signal-processing head portion of said head means.

9. The apparatus according to claim 1, wherein said reproducing unit means comprises:

an analog video signal reproducing unit for processing the reproduced analog video signal output by said analog video signal-processing head portion of said head means through said switching means into a form suitable for being output as an output analog video signal; and a digital video signal reproducing unit for processing the reproduced digital video signal output by said digital video signal-processing head portion of said head means through said switching means into a form suitable for being output as an output digital video signal.

10. An apparatus for recording and reproducing digital and analog video signals, the apparatus comprising:

input switch means for selecting one of an analog video signal and a digital video signal to be inputted in a record mode;

recording unit means for processing said video signal selected by said input switch means into a signal recordable on a video tape;

head means carried by a rotatable head drum means and maintained in relation with video tape over at least 180° of the rotation of said head drum means for recording, in accordance with the rotation of said head drum means relative said video tape, and in said record mode a video signal on said tape as inclined tracks thereon and for, in a reproducing mode, reproducing said video signal recorded on the tape, said head means having an analog video signal-processing head portion for recording and reproducing analog video signals on and from said video tape and a digital video signal-processing head portion for recording and reproducing digital video signals on and from said video tape, wherein said head means comprises four heads carried by said head drum and arranged spaced from one another at an angle of 90° to define a phase angle of 90° between adjacent ones of said heads, two 180°-opposing ones of said heads constituting said analog video signal-processing head portion and the other two 180°-opposing ones of said heads constituting said digital video signal-processing head portion;

switching means for selecting one of said analog video signal-processing head portion and said digital video signal-processing head portion of said head means to record the video signal processed by said recording unit on the video tape in the record mode and to output said video signal reproduced from the video tape by the head means in the reproducing mode;

reproducing unit means for receiving said reproduced video signal output from the head means through said switching means and processing the received video signal into a form suitable for being output;

output switch means for outputting the video signal processed by the reproducing unit means;

current control unit means for varying an amount of a control current applied to said recording unit means for varying a bandwidth and a characteristic of said recording unit means according to selection by said input switch means of the analog video signal or the digital video signal to be inputted; and automatic gain control unit means for automatically controlling a gain of said reproduced video signal processed by said reproducing unit means whereby the gain of the reproduced video signal is varied based on a corresponding one of a digital video signal bandwidth and an analog video signal bandwidth.

* * * * *